July 29, 1941. D. L. STOKESBARY 2,250,896
FRONT VIEW MIRROR DEVICE
Filed July 10, 1940

Delbert L. Stokesbary
INVENTOR
BY Victor J. Evans & Co.
ATTORNEYS

Patented July 29, 1941

2,250,896

UNITED STATES PATENT OFFICE 2,250,896

FRONT VIEW MIRROR DEVICE

Delbert L. Stokesbary, Ferndale, Wash.

Application July 10, 1940, Serial No. 344,799

1 Claim. (Cl. 88—87)

This invention relates to front vision mirror devices for motor vehicles and its general object is to provide a device of the periscope type, that is primarily designed for attachment to the left side of a vehicle to reflect oncoming vehicles, when the line of vision directly in front of my mirror equipped vehicle is obstructed by a slow moving vehicle, such as a truck or the like, thus it will be seen that my device materially facilitates safe driving as it enables a driver of a vehicle equipped therewith to see the highway in front of the obstructing vehicle.

A further object is to provide a front vision mirror device for motor vehicles, that is readily adjustable to various angles, and can be attached to a vehicle in an easy, expeditious and theft proof manner, but casual removal or displacement is practically impossible.

Another object is to provide a front vision mirror device of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 2 is a top plan view illustrating my device applied to a door of a motor vehicle.

Figure 3 is a front view of the device, looking toward the left of Figure 2.

Figure 4 is a sectional view taken approximately on line 4—4 of Figure 2, looking in the direction of the arrows.

Figure 5 is a sectional view taken approximately on line 5—5 of Figure 2, looking in the direction of the arrows.

Figure 6 is a detail view of one of the swivel headed clamping screws used for attaching the device to a vehicle.

Figure 1:
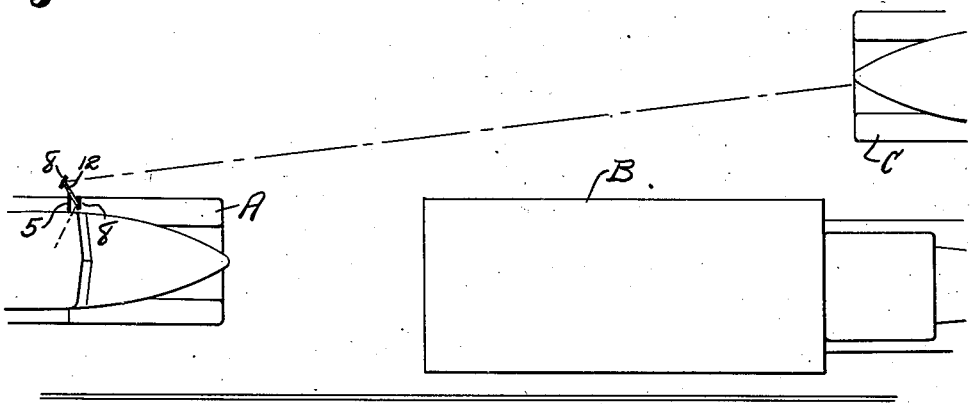
Figure 1 is a diagrammatic view illustrating the manner in which my mirror device comes into use.
Figure 1:
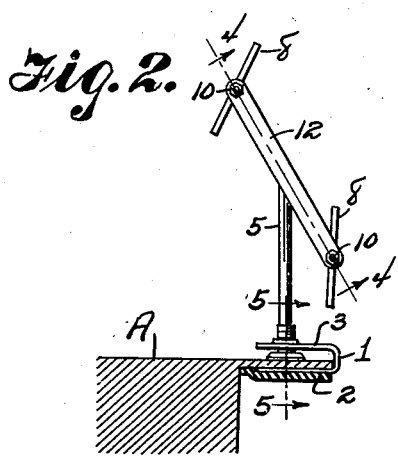
Figure 1:
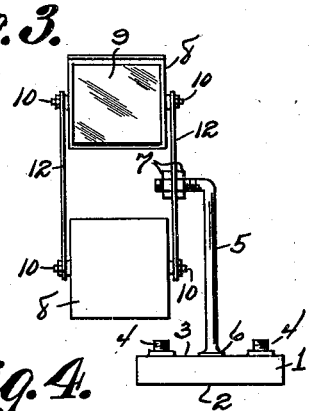
Figure 1:
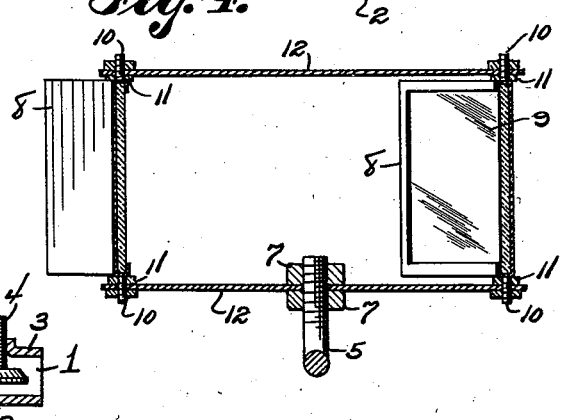
Figure 1:
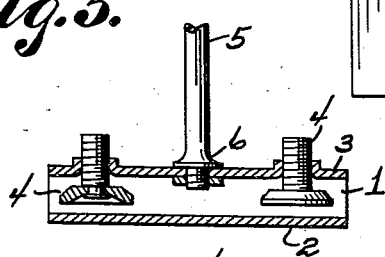
Figure 1:

Referring to the drawing in detail, it will be noted from Figure 1 that A indicates a vehicle equipped with my mirror device, B a truck travelling in front of and in the same direction as the vehicle A, and C an oncoming vehicle obstructed by the truck from direct view of the driver of the vehicle A, but which can be seen by the said driver from the reflection in the mirror device, with the result the use and advantages of my device, from a safety standpoint will be obvious from Figure 1.

The device in the form shown includes an attaching bracket provided with a base member 1 made from sheet metal or any other suitable material, that is folded in U-form to provide flat inner and outer jaw portions 2 and 3 respectively, the base member being shown as attached to the front portion of the marginal flange of the left hand door of the vehicle and in a manner whereby the flange 2 is disposed between the door insulating strip and the flange. In order to fix the device to the flange, I provide a pair of headed screws 4 threaded through the outer jaw portion 3, with the heads between the portions 2 and 3 to set up a gripping engagement with the flange, as will be obvious upon inspection of Figure 2, and the heads are swiveled to the shanks of the screws so as to tend to increase the clamping action. The outer ends of the shanks may be kerfed for receiving a screw driver of the usual type, but the outer ends or faces thereof are preferably provided with a pair of sockets for receiving a pair of prongs of a special tool, not shown, for attaching the device to the vehicle, so as to render removal extremely difficult, without the use of the special tool, thus it will be seen that the device is substantially theft proof.

The bracket likewise includes an arm 5 provided with an annular shoulder 6 adjacent to its inner end and the latter is threaded and disposed through the outer jaw portion 3 centrally thereof, for disposal of the shoulder against the same, for cooperation with a nut on the threaded end for securing the arm to the base member 1, as clearly shown in Figure 5. The outer end of the arm 5 is bent at right angles upon itself and the right angle bent portion is threaded for a portion of its length to receive lock nuts 7 for securing the mirror assembly to the arm, as best shown in Figure 4.

The mirror assembly includes a pair of mirrors, each of which in the form as shown includes a casing frame 8 having mounted therein suitable reflecting means 9 such as coated glass, highly polished metal or the like. Each of the frames 8 have fixed thereto and extending from diametrically opposite sides thereof threaded trunnions 10 having mounted thereon washers 11 engaged with the frame and the mirrors are connected together in spaced relation with respect to each other by flat link bars 12 having openings adjacent to the ends thereof for receiving the trunnions 10 therein, and threaded on the trunnions are nuts 13 bearing against the bars, as best shown in Figure 4, so as to hold the mirrors in any adjusted position, it being obvious from the structure mentioned that the mirrors can be swung on the trunnions to various positions to cooperate with each other in the same manner as a periscope.

One of the link bars 12 is provided with an opening midway the ends thereof in the form as shown, for receiving the right angle bent end of the arm 5, and the lock nuts 7 bear upon the opposite sides of the link bar for holding the mirror assembly adjustably secured to the arm, with the result it will be seen that the mirrors are not only adjustable with respect to each other, but the mirror assembly is adjustable with respect to the attaching bracket, while the arm 5 is adjustable with respect to the base member.

While I have illustrated my mirror device as being applied to the door of a vehicle, it will be obvious that it can be applied to any other suitable portion of the vehicle, and the bracket structure may be varied for that purpose.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A front view mirror device for a motor vehicle, comprising an attaching bracket including a base made up of sheet material folded in U-form to provide a pair of jaw portions, one of said jaw portions having threaded openings therein, swivel headed screws threaded in the openings and having the heads thereof arranged between the jaw portions for cooperation with the other jaw portion for securing the bracket to the vehicle, said screws having tool receiving sockets in the outer ends thereof, an arm having one end adjustably secured to said base and the opposite end portion being bent at a right angle to the remaining portion, a mirror assembly including a pair of mirrors provided with casing frames, reflecting means within said frames, trunnions secured to the casing frames upon diametrically opposite sides thereof, link bars having openings therein and mounted on the trunnions for connecting the mirrors together for relative adjustment and cooperative association with each other, and one of the link bars being secured to the right angle bent portion of the arm for adjustment of the mirror assembly with respect to the bracket.

DELBERT L. STOKESBARY.